United States Patent Office 3,251,455
Patented May 17, 1966

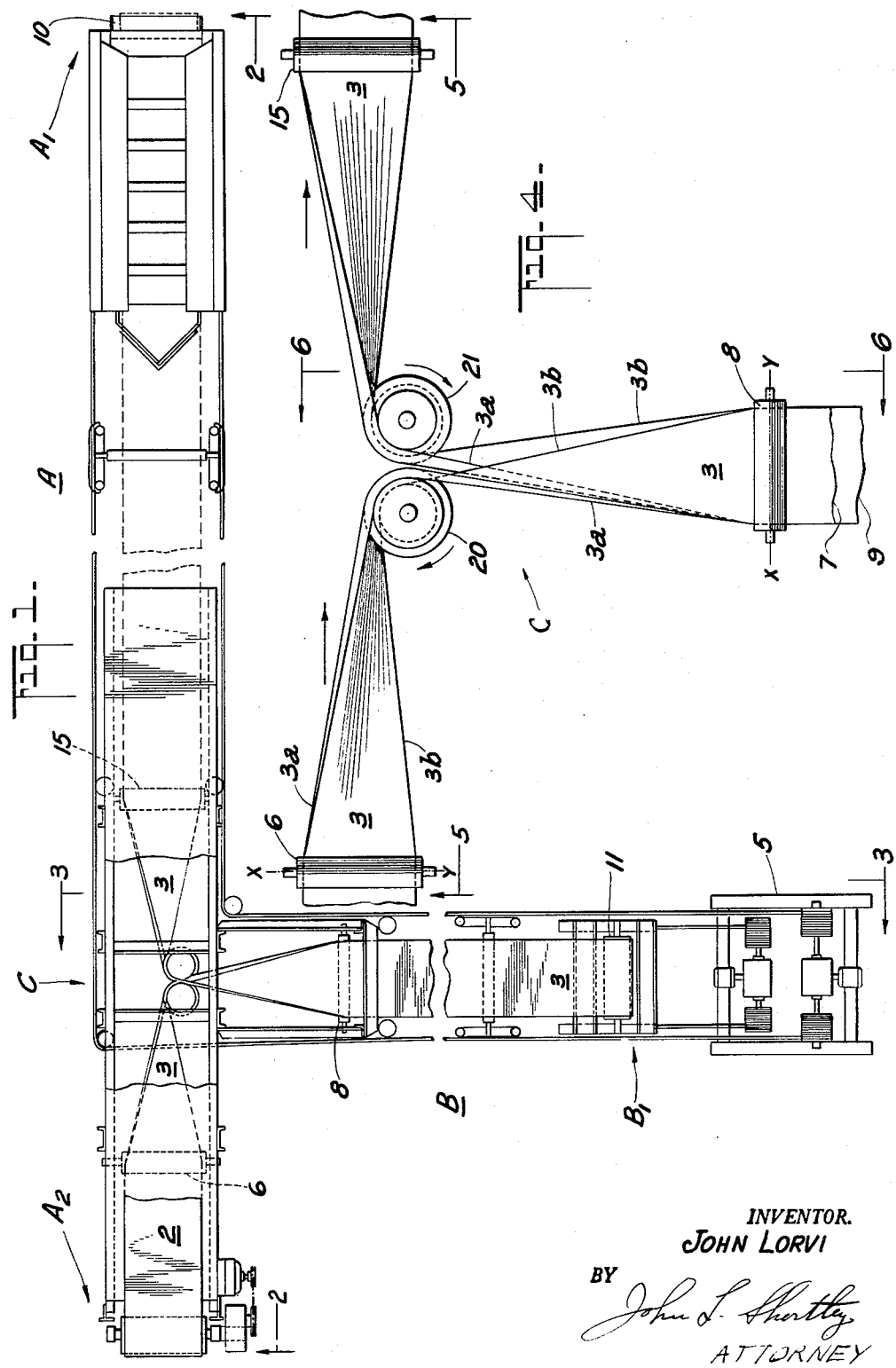

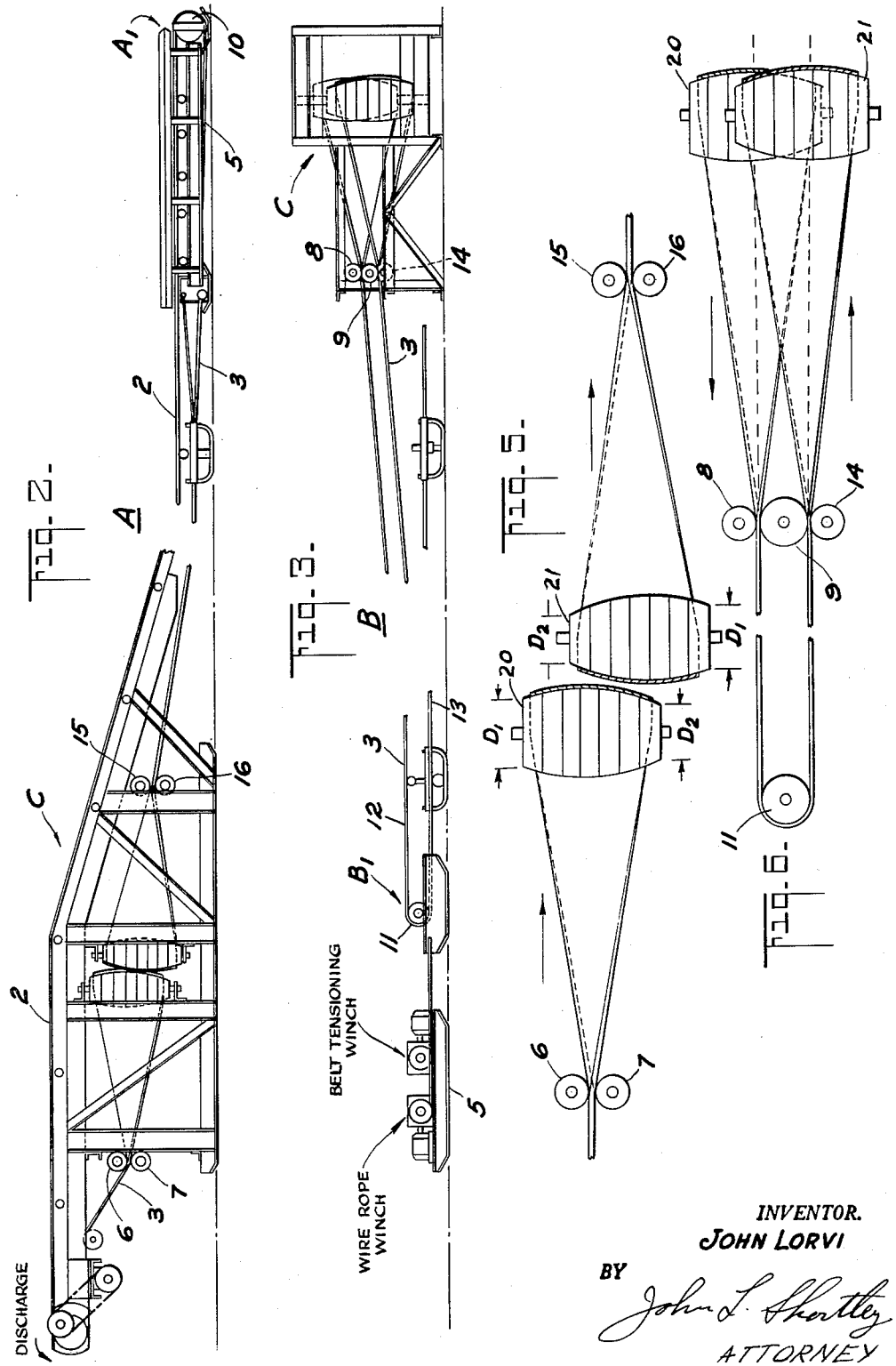

3,251,455
BELT CONVEYOR STORAGE SECTION WITH LONGITUDINALLY UNSYMMETRICAL TRANSFER PULLEYS
John Lorvi, Passaic, N.J., assignor to Litton Industries, Inc., a corporation of Delaware
Filed Aug. 5, 1963, Ser. No. 299,843
10 Claims. (Cl. 198—139)

This invention relates to an extensible belt conveyor system and in particular to an improved transfer arrangement for such a system.

In underground mining operations, extensible belt conveyor systems are used in conjunction with modern loading machines. Such systems comprises a conveying section, which can be lengthened and shortened, a belt storage section through which the return reach of belt in the conveying section is continuously passed, and a transfer section wherein the return reach of the conveying section is turned into the storage section. In order to lengthen or extend the conveying section, the quantity of belt in the storage section is reduced and vice versa.

A system of this type is known from U.S. Patent 2,733,806.

The improvement according to this invention relates to transfer pulleys and related apparatus whereby the return reach of belt in the conveyor section is transferred into and out of the storage section. Heretofore, elaborate and therefore expensive measures have been necessary to support the belt while in the storage section so that it would not slip from the transfer pulleys of the transfer section. In addition, the equipment for supporting the belt in the storage section was bulky, which required that the storage tunnel had to be made quite large in width and height. Obviously, a large storage tunnel requires considerable digging and shoring and, at the area of intersection between the storage tunnel and the heading or main tunnel (within which the mining operation is conducted), the problems and cost of shoring is considerably increased.

The improved transfer apparatus, hereinafter fully described, prevents unequal transverse stress in the belt being transferred and the resultant tendency of the belt to slip off the transfer pulleys is therefore overcome. Additionally, apparatus for supporting the stored belt is standard equipment and therefore economical, and the take-up tunnel can be smaller than heretofore required.

An object of the invention, therefore, is to provide apparatus for turning a conveyor belt through an angle transversely of its length in order to change its direction of travel without introducing transverse stress thereto.

Another object of the invention is ot provide an improved extensible belt conveyor system.

Another object of the invention is to provide an improved transfer apparatus for an extensible belt conveyor system.

Another object of the invention is to provide an improved belt transfer apparatus which allows the belt in the storage tunnel to be supported in the most desirable and economic manner and with a minimum requirement of floor space and head room.

The foregoing objects and additional objects and advantages will be apparent from the following description of the accompanying drawing illustrating, by way of example, a presently preferred embodiment of the invention, in which:

FIG. 1 is a schematic plan view of an extensible belt conveyor system with an improved transfer section in accordance with this invention;

FIG. 2 is a sectional side elevation of the conveying section of the system according to FIG. 1, taken along line 2—2 thereof;

FIG. 3 is a side elevation partly in section of the storage section of the system according to FIG. 1, taken along line 3—3 thereof;

FIG. 4 is an enlarged detailed plan view of the transfer section according to this invention as seen in FIG. 1;

FIG. 5 is an elevational view taken along line 5—5 of FIG. 4; and

FIG. 6 is another elevational view taken along line 6—6 of FIG. 4.

A plan view of an extensible belt conveyor system is illustrated in FIG. 1. In general the system consists of a conveying section generally designated A and a take-up and storage section generally designated B. In FIG. 2, a side elevation is shown of the conveyor section A and in FIG. 3 a side elevation of the storage section B is shown. Between the conveying section A and storage section B a transfer section C is provided for transferring the return reach of belt in the conveying section into the storage section. The improved transfer section in accordance with this invention is shown in FIGS. 1, 2 and 3.

In operation, material is supplied to the conveying section from a continuous loader (not shown) at the head or extensible end $A_1$. This material is discharged to other means of transport (not shown) at the relatively fixed discharge end $A_2$ of the conveyor section. The material is carried on troughed rollers in the upper reach of the belt 2 and the belt may be supported by flat rollers in the return reach 3 as is well known. Between the discharge end $A_2$ of the conveyor section A and the head end $A_1$ thereof, the return reach 3 of the belt is transferred into a storage section B, generally in a tunnel at a right angle to the heading tunnel, and then back into the return reach of the conveyor section. As the mining operation progresses, the head end $A_1$ of the conveyor section is moved to lengthen the conveyor section A. The belt required for lengthening the section A is supplied from the return reach of belt in the storage section B by correspondingly shortening the length of belt in the storage section.

The head end $A_1$ of the conveyor section and take-up end, or tail end $B_1$ of the storage section B, are moved in unison by any suitable locomotive, crawler, sled, or like means 5, as is known. The motive means 5 are connected with a head end pulley 10 and tail end pulley 11. Also, any suitable arrangement for increasing or decreasing the spacing or number or troughing and return idlers for supporting the belt in the conveying section, as well as the idlers and return idlers for supporting the belt in the storage section, may be utilized. All structural details of the conveyor system of FIGS. 1, 2 and 3 are considered to be within the skill of the art and further description thereof unnecessary.

The improvement according to the invention resides in the transfer section C of FIGS. 1, 2 and 3 and is shown in greater detail in FIGS. 4, 5 and 6. As hereinabove noted, FIG. 4 is a detailed view of the transfer section as viewed in FIG. 1; FIGS. 5 and 6 are also detailed views of the transfer section as seen in FIGS. 2 and 3, as well as views taken along lines 5 and 6 of FIG. 4. In FIGS. 4, 5 and 6, the arrows indicate direction of movement of the parts with which they are associated.

Referring to FIG. 4, it will be seen that the return reach of the belt 3 is in the horizontal plane as it approaches the transfer pulley 20. Therefore, the edge of the return reach of belt 3, designated $3a$, must travel a greater distance than the opposite edge $3b$ in making a turn into the storage tunnel. As a result, a transverse stress is created in the belt which will cause it to ride up or down and pull off of the transfer pulley 20. To eliminate this transverse stress, as well as the transverse stress due to belt sag, and accompanying movement of the belt relative to the transfer pulley, the distance each edge of the belt travels must be made equal and the belt supported to minimize sag. Thus, the transfer pulley must be unsymmetrically shaped such that distance x—x, traversed by the edge of belt 3a, is equal to the distance y—y traversed by the edge of the belt 3b.

Referring now to FIGS. 4, 5 and 6, the return flight 3 of the belt, approaching the transfer section C, passes between a first pair of snubbing rollers 6 and 7. The flight is thereafter turned through an angle (90° as shown in the drawing) and simultaneously lifted from the horizontal into a vertical plane as it passes over the entrance transfer pulley 20. After passing over the entrance transfer pulley 20, the flight is returned to the horizontal plane by a second pair of snubbing rollers 8 and 9 also associated with the flight entering the storage section B. The top strand 12 of the belt in the take-up section, supported by idlers (FIG. 3), passes around the tail-end pulley 11 of the take-up or storage section B and becomes bottom strand 13 of said section. The bottom strand, also supported by idlers (FIG. 3), passes through a first pair of exit snubbing rollers 9 and 14 and the flight is again turned from the horizontal to the vertical as it passes exit transfer pulley 21. The second pair of exit snubbing rollers 15 and 16 return the flight from the vertical to the horizontal return reach 3 of the conveyor section.

From FIGS. 4 and 5 it will be appreciated that the transfer pulleys 20 and 21 can be placed very close to one another due to their longitudinally unsymmetrical shape or profile as well as the vertical stagger or offset arrangement shown. As a result, the center line of the top and bottom strands 12 and 13 of the take-up runs are substantially in the same vertical plane and the horizontal plane of strands 12 and 13 is in the plane of the large diameter D of the pulley as illustrated by the dash line in FIGURE 6. As a result stresses in the belt are minimized and a significant saving of floor space is achieved in the storage tunnel or section.

By virtue of the longitudinally unsymmetrical profiles, each of the transfer pulleys 20 and 21 has a relatively large diameter $D_1$ at one end and a relatively smaller diameter $D_2$ at its other end. The major diameter D of each pulley is centrally located and the central transverse axis of each pulley is in the horizontal plane of the associated flight in both the conveying section and storage section. In other words, the central transverse axis of transfer pulley 20 is in the plane defined between snubbing rollers 6, 7 and 8, 9 and the central transverse axis of transfer pulley 21 is in the plane of snubbing rollers 9, 14 and 15, 16.

In FIG. 5, the entrance transfer pulley 20 is disposed with its large end uppermost and exit transfer pulley 21 is inverted, that is, disposed with its large end lowermost. As a result of the unsymmetrical shape of the transfer pulleys 20 and 21, the inverted position of pulley 21 and the vertical offset of these pulleys, they can be placed in close proximity so that the belt requires a minimum of floor space in the storage tunnel. Also, head space in the storage tunnel is held to a minimum by maintaining the take-up section of belt in a horizontal plane as opposed to maintaining the belt vertical as in the prior art arrangement.

It should be noted from FIG. 5 that the belt has been rotated 180° about its horizontal axis (turned over) between entrance snubbing rollers 6, 7 and 8, 9, i.e., the top surface of the belt passing between rollers 6 and 7 is the bottom surface of the belt as it passes between rollers 8 and 9. After the belt passes over the tail end pulley 11 (FIG. 3), the belt surface is again turned over. In other words, the upper surface of the belt in the entrance run or top strand 12 of the storage section is the lower surface of the belt in the exit run or bottom strand 13 of the storage section. As a result, the belt is not rotated about its longitudinal axis as it passes over the exit transfer pulley 21.

Obviously, the belt can be rotated 180° about its longitudinal axis either upon entry or exit from storage but is only rotated one time about its longitudinal axis to compensate for the turnover at the horizontal tail end pulley. Rotating the belt 180° as explained above does not present a problem with the transfer apparatus according to the invention and if the belt in the storage section is maintained in the vertical plane, more tunnel head space is required and more floor space is required as well, because the transfer pulleys must be spaced a greater distance apart than shown in the drawing.

To reduce drag on the belt entrance transfer pulley 20 and exit transfer pulley 21 are preferably segmented pulleys, that is, the pulleys consist of a plurality of discrete discs each separately journalled on the pulley shaft such as seen in FIG. 2 of the above-noted patent or any other suitable manner. However, unlike the known segmented pulleys, the entrance and exit transfer pulleys according to this invention are unsymmetrical.

As indicated in FIGURE 6, the vertical offset of pulleys 20, 21 may be such as to place the major diameter of the pulleys in the plane of the belt strands in the storage section and due to the unsymmetrical shape of the pulleys a minimum of floor space is required for this.

The foregoing is given only by way of example and illustration and is not intended as a limitation of the scope of the subjoined claims.

What is claimed is:

1. An improved extensible belt conveyor system comprising a conveying section having a movable head end for receiving material to be conveyed and a discharge end, a transfer section for transferring the return reach of belt of said conveying section into a storage section, said storage section having a movable take-up end for movement in unison with said head end; means in said transfer section for supporting the entrance and exit run of belt of said storage section in a substantially horizontal spaced parallel relation, a pair of longitudinally unsymmetrical transfer pulleys, means for vertically supporting said transfer pulleys in staggered relation with the major diameter of one of said pulleys being substantially in the plane of said entrance run and the other of said pulleys having its major diameter in the plane of said exit run, said transfer pulleys being shaped and dimensioned for transferring said belt under substantially equal tensile stress.

2. An extensible belt conveyor system according to claim 1, wherein said transfer pulleys are spaced so that said entrance and exit runs are located one above the other in horizontal planes and the longitudinal axis of said runs lies in one substantially vertical plane.

3. An extensible belt conveyor system according to claim 2, wherein said conveyor belt is rotated 180° about its longitudinal axis by each said pulley within said transfer section.

4. An improved extensible belt conveyor system according to claim 1, wherein said transfer pulleys comprise a plurality of discrete discs each separately journalled on a pulley shaft, each said disc having a different diameter chosen to equalize the distance the incremental longitudinal portions of said belt travel within said transfer section.

5. An improved transfer section for an extensible belt conveyor system comprising a pair of substantially identically longitudinally unsymmetrical transfer pulleys, means for supporting said pulleys in spaced parallel staggered relation whereby the plane of the major diameter of one of said pulleys is spaced from the plane of the major diameter of the other of said pulleys, and one of said pulleys is inverted relative to the other of said pulleys.

6. An improved transfer section according to claim 5, wherein said pulleys each comprise a plurality of separately rotatable discrete disc-like portions, the end portions of each said pulley being of unequal diameter and the central portion thereof being the major diameter of each said pulley.

7. An improved transfer apparatus for an extensible belt conveyor system comprising a pair of longitudinally unsymmetrical transfer pulleys having a major diameter, means supporting said transfer pulleys in vertical spaced parallel relation with the major diameter of the entrance transfer pulley elevated above the major diameter of the exit transfer pulley, a first horizontal entrance snubbing roller means for guiding a conveyor belt approaching said entrance transfer pulley and a second horizontal entrance snubbing roller means for guiding a conveyor belt after it has passed over said entrance transfer pulley, the guiding plane of said first and second entrance snubbing roller means being in the plane of the major diameter of said entrance transfer pulley, a first horizontal exit snubbing roller means for guiding a conveyor belt approaching said exit transfer pulley and a second horizontal exit snubbing roller means for guiding a conveyor belt after it has passed over said exit transfer pulley, the guiding plane of said first and second exit snubbing roller means being in the plane of the major diameter of said exit transfer pulley.

8. In an extensible belt conveyor system; means comprising a belt conveyor having a movable head end for receiving material to be conveyed and a discharge end, means comprising a transfer section for transferring the return reach of belt of said conveyor section into storage section means; said storage section means supporting the entrance and exit runs thereof in spaced substantially horizontal planes and a movable horizontal tail-end pulley movable in unison with movement of said head-end; said means comprising a transfer section including means for maintaining the belt entering and leaving said transfer section in an entrance plane and an exit plane, a vertical transfer pulley at the entrance of said transfer section, said entrance pulley having a generally ellipsoid profile with its major diameter in said entrance plane, a vertical exit pulley adjacent said entrance pulley having a generally ellipsoid profile with its major diameter in said exit plane and being inverted relative to said entrance pulley.

9. In an extensible belt conveyor system, means comprising a belt conveyor section having a movable head end for receiving material to be conveyed and a discharge end, means comprising a transfer section for transferring the return reach of belt of said conveying section into a storage section means; said storage section means supporting the entrance and exit runs thereof in spaced substantially horizontal planes, a movable horizontal tail-end pulley movable in unison with movement of said head-end; said means comprising a transfer section including means for maintaining the belt entering and leaving said transfer section in an entrance plane and an exit plane, a vertical transfer pulley at the entrance of said transfer section, said entrance pulley having a generally ellipsoid profile with its major diameter in said entrance plane, a vertical exit pulley adjacent said entrance pulley having a generally ellipsoid profile with its major diameter in said exit plane and being inverted relative to said entrance pulley, said storage section means maintaining said entrance and exit runs of said storage section in the said entrance and exit planes, the longitudinal axis of said entrance and exit runs being in a substantially vertical plane, said vertical plane bisecting the plane defined by the axis of revolution of each said transfer pulley.

10. In an extensible belt conveyor system; means comprising a belt conveyor section having a movable head end for receiving material to be conveyed and a discharge end, means comprising a transfer section for transferring the return reach of belt of said conveying section into a storage section means; said storage section means supporting the entrance and exit runs thereof in spaced substantially horizontal planes, a movable horizontal tail-end pulley movable in unison with movement of said head-end; said means comprising a transfer section including means for maintaining the belt entering and leaving said transfer section in an entrance plane and an exit plane, a vertical transfer pulley at the entrance of said transfer section, said entrance pulley having a generally ellipsoid profile with its major diameter in said entrance plane, a vertical exit pulley adjacent said entrance pulley having a generally ellipsoid profile with its major diameter in said exit plane and being inverted relative to said entrance pulley, said storage section means maintaining said entrance and exit runs of said storage section in the said entrance and exit planes, the longitudinal axis of said entrance and exit runs being in a substantially vertical plane, said vertical plane bisecting the plane defined by the axis of revolution of each said transfer pulley, said belt being turned 180° about its longitudinal axis as it transverses between the return reach of said conveyor section through said means comprising a transfer section and said storage section means.

References Cited by the Examiner

UNITED STATES PATENTS

| 2,222,019 | 11/1940 | Buchanan | 198—184 |
| 2,561,708 | 7/1951 | Milik | 198—184 |
| 2,733,806 | 2/1956 | Lanier | 198—139 |
| 2,798,590 | 7/1957 | Raskin | 198—184 |
| 2,976,982 | 3/1961 | Murphy | 198—184 |

FOREIGN PATENTS

| 867,517 | 2/1953 | Germany. |
| 636,388 | 4/1950 | Great Britain. |

EVON C. BLUNK, *Primary Examiner.*

SAMUEL F. COLEMAN, *Examiner.*

R. E. KRISHER, *Assistant Examiner.*